United States Patent [19]

Aboaf et al.

[11] Patent Number: 5,713,122
[45] Date of Patent: Feb. 3, 1998

[54] HARD-FILM STABILIZED SOFT-FILM BIASED MAGNETORESISTIVE SENSOR WITH AN ALUMINA UNDER LAYER PATTERN FOR IMPROVED LONGITUDINAL SERVO-POSITIONING LINEARITY AND STABILITY

[75] Inventors: Joseph Adam Aboaf; Edward Virgil Denison; Vincent Noel Kahwaty, all of Tucson, Ariz.

[73] Assignee: International Business Machines Corporation, Armonk, N.Y.

[21] Appl. No.: 449,382

[22] Filed: May 23, 1995

Related U.S. Application Data

[62] Division of Ser. No. 286,603, Aug. 5, 1994, abandoned, which is a continuation of Ser. No. 999,510, Dec. 30, 1992, abandoned.

[51] Int. Cl.$^6$ .................................................. G11B 5/127
[52] U.S. Cl. ......................... 29/603.08; 29/603.13; 29/603.14; 29/603.15; 29/603.27; 427/131; 427/132
[58] Field of Search ............... 29/603.08, 603.13, 29/603.14, 603.15, 603.27; 360/113, 125, 126; 338/32 R; 324/252; 427/128, 131, 132

[56] References Cited

U.S. PATENT DOCUMENTS

| | | | |
|---|---|---|---|
| 3,840,898 | 10/1974 | Bajorek et al. | 360/113 |
| 4,024,489 | 5/1977 | Bajorek et al. | 338/32 R |
| 4,477,794 | 10/1984 | Nomura et al. | 338/32 R |
| 4,556,925 | 12/1985 | Suenaga et al. | 360/113 |
| 4,639,806 | 1/1987 | Kira et al. | 360/113 |
| 4,663,685 | 5/1987 | Tsang | 360/113 |
| 4,729,048 | 3/1988 | Imakoshi et al. | 360/103 |
| 4,757,410 | 7/1988 | Seko et al. | 360/113 |
| 4,843,505 | 6/1989 | Mowry | 360/113 |
| 4,940,511 | 7/1990 | Fontana, Jr. et al. | 29/603.15 X |
| 5,018,037 | 5/1991 | Krounbi et al. | 360/113 |
| 5,079,035 | 1/1992 | Krounbi et al. | 427/130 |
| 5,123,156 | 6/1992 | Meunier et al. | 29/603.15 |
| 5,454,158 | 10/1995 | Fontana, Jr. et al. | 29/603.14 X |

*Primary Examiner*—S. Thomas Hughes
*Attorney, Agent, or Firm*—Baker Maxham Jester & Meador

[57] ABSTRACT

A magnetoresistive sensor design and fabrication process that provides improved microtrack profile linearity for servo elements while simultaneously providing stable and linear data sensing elements suitable for high density tape head applications. The stability and uniformity of both data and servo sensor elements is enhanced through the use of a grating profile under both the soft film biased magnetoresistive sensor layer and the hard bias stabilizing magnets. Processing steps are eliminated by replicating the grating pattern for the servo sensor elements through a thick layer of alumina or silicon dioxide. The outer read shield is removed from the servo elements using a stripping process that eliminates structural damage arising from alumina pinholes. Both element types are free of significant Barkhausen noise and instability because of the grating-stabilized domains in both the active magnetoresistive regions and the passive hard-biasing regions of each sensor. Each servo sensor is disposed at a greater distance from the single shield to optimize the microtrack profile. The resulting reduction in servo sensor frequency response leaves sufficient bandwidth for precise servo positioning.

6 Claims, 8 Drawing Sheets

ELEVATED GRATING PATTERN

BASE GRATING PATTERN

45nm GROOVE DEPTH 84.5nm GROOVE DEPTH

WITHOUT GRATING

WITH GRATING

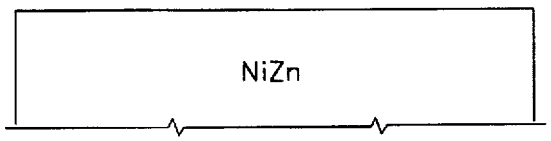

FIG. 11A

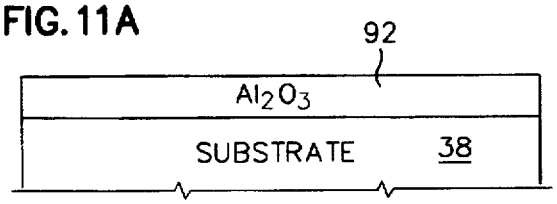

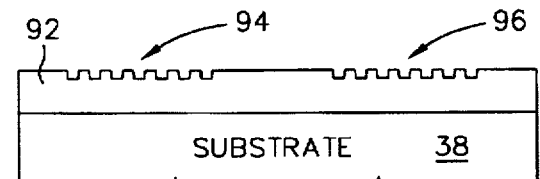

FIG. 11E

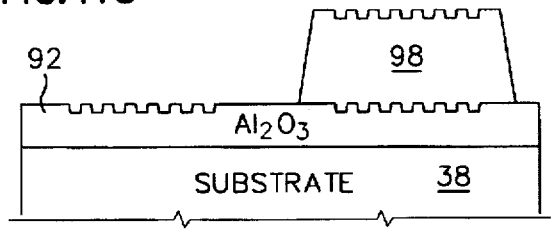

FIG. 11G

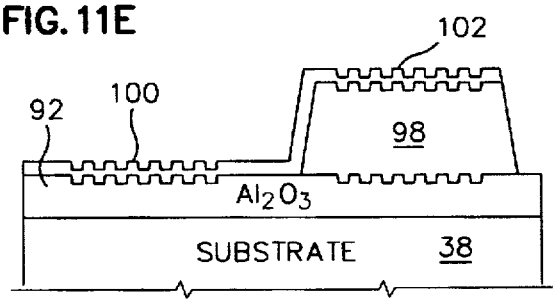

FIG. 11I

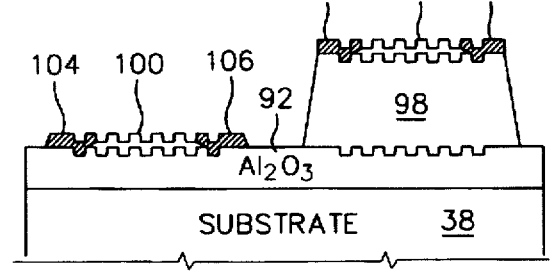

| | PROCESS STEPS |
|---|---|
| FIG. 12A | PREPARE NiZn P₁ SHIELD SUBSTRATE |
| FIG. 12B | SPUTTER ALUMINA I₁ LAYER 2800Å THICK |
| FIG. 12C | RESIST MASK AND ION MILL CHEVRON PATTERN IN I₁ ALUMINA LAYER TO 450Å ±150Å DEPTH |
| FIG. 12D | CLEAN AND ADD RESIST LAYER (NOT SHOWN) |
| FIG. 12E | SPUTTER SiO₂ OR Al₂O₃ SERVO ELEVATION LAYER 7200Å THICK |
| FIG. 12F | LIFT OFF MASKED REGION (NOT SHOWN) |
| FIG. 12G | SPUTTER S.F.B. MR ELEMENTS NiFeRh/Ta/NiFe TO 270/200/350Å WITH MAGNET AND HEAT; TOTAL= 820Å LAYER |
| FIG. 12H | SPUTTER ETCH MASKED AREA (NOT SHOWN) |
| FIG. 12I | SPUTTER HARD BIAS FILM Cr/CoPtCr TO 150/1050Å FOR TOTAL LAYER= 1200Å LIFT OFF MASKED REGION (NOT SHOWN) |
| FIG. 12J | SPUTTER ETCH MASKED AREA (NOT SHOWN) |

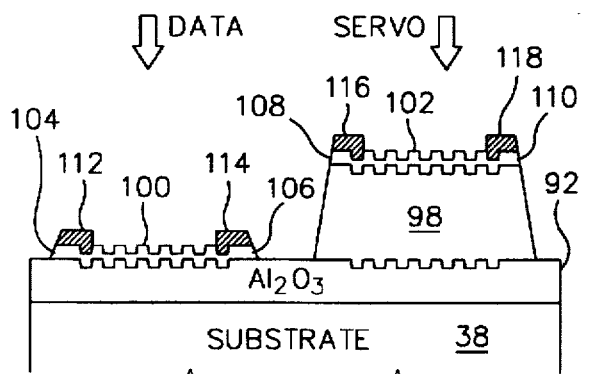

FIG. 11K

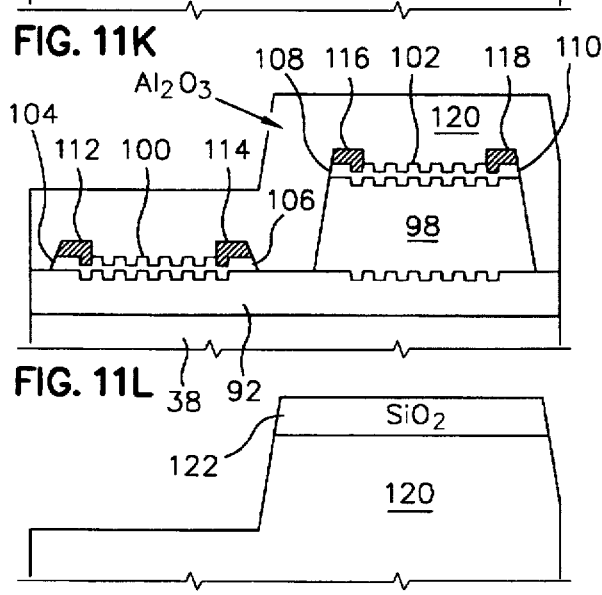

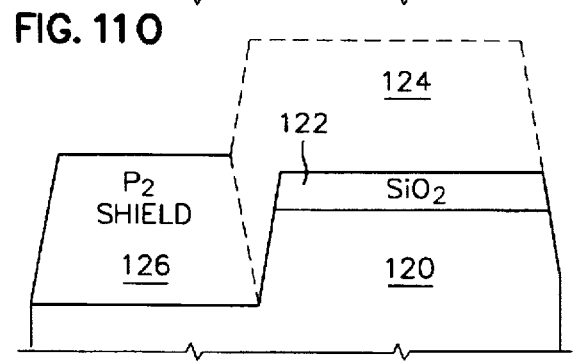

FIG. 11T

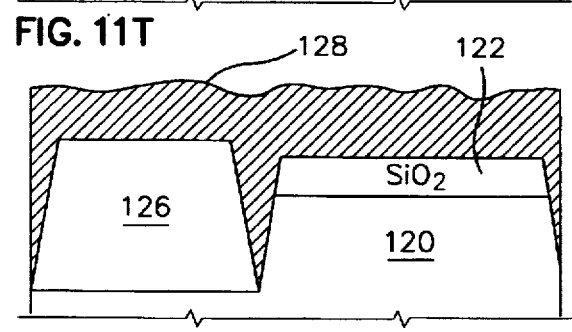

FIG. 11U

FIG. 12K — CLEAN AND ADD RESIST LAYER (NOT SHOWN); SPUTTER MR CONDUCTOR FILM Ti/Au/Ti TO 150/2000/50Å FOR TOTAL LAYER= 2200Å; LIFT OFF MASKED REGION (NOT SHOWN)

FIG. 12L — SPUTTER ALUMINA $I_2$ LAYER 3200Å ±320Å

FIG. 12M — MASK AND ETCH $I_2$ (NOT SHOWN)

FIG. 12N — CLEAN AND ADD RESIST LAYER (NOT SHOWN)

FIG. 12O — SPUTTER $SiO_2$ LAYER OVER SERVO SENSOR ONLY TO 1000Å

FIG. 12P — CLEAN AND ADD RESIST LAYER (NOT SHOWN)

FIG. 12Q — DEPOSIT CONDUCTOR LAYER (NOT SHOWN) Ti/Au TO 500Å/25,000Å

FIG. 12R — CLEAN AND ADD RESIST LAYER (NOT SHOWN)

FIG. 12S — SPUTTER $P_2$ SHIELD (89 LAYERS) NiFe 350Å +NiFe (Fe/NiFe)44 TOTALLING 35,000Å WITH MAGNET

FIG. 12T — CLEAN, MASK, ION MILL ETCH, MASK AND CHEMICALLY REMOVE $P_2$ LAYER FROM SERVO SENSOR ONLY

FIG. 12U — SPUTTER ALUMINA OVERLAYER TO 235,000Å +

FIG. 12V — FINISH, LAP, AND SPUTTER 2000Å Cr LAYER (NOT SHOWN)

FIG. 12W — CLEAN, MASK AND FORM BONDING VIAS TO CONDUCTORS

HARD-FILM STABILIZED SOFT-FILM BIASED MAGNETORESISTIVE SENSOR WITH AN ALUMINA UNDER LAYER PATTERN FOR IMPROVED LONGITUDINAL SERVO-POSITIONING LINEARITY AND STABILITY

CROSS-REFERENCES TO RELATED APPLICATIONS

This application is a division of application Ser. No. 08/286,603 filed Aug. 5, 1994, now abandoned, which is a file-wrapper continuation of application Ser. No. 07/999,510 filed Dec. 30, 1992, now abandoned.

FIELD OF THE INVENTION

This invention relates generally to thin film magnetic tape read heads and, more specifically, to a multiple-sensor assembly employing an unshielded servo-positioning sensor design having improved microtrack field uniformity.

DISCUSSION OF THE RELATED ART

The magnetoresistive (MR) sensor is known as a magnetic transducer for reading data from a magnetic surface at high linear data densities. The MR sensor detects magnetic field signals as resistance changes in a MR stripe. Signal levels for the MR sensor head are generally much higher than for conventional inductive read heads. Furthermore, the output of the MR head depends only on the instantaneous magnetic field from the media and is independent of media velocity or time rate of change of the sensed fields.

FIG. 1 shows the MR sensor strip geometry known in the art. In its simplest form, the sensor consists of a narrow strip of magnetoresistive materials such as NiFe, NiCo, or CoFe, of height h and length $w_r$. The stripe is mounted in a plane perpendicular to the recording medium and connected to conductors at each end carrying a sense current $I_s$. Because of the magnetoresistive effect, the resistivity of each portion of this stripe depends on the angle θ between the direction of magnetization $M_s$ and the current-density vector, as is well-known in the art. In general, the magnetization vector Ms represents the sum of a local bias field and the field from the recording medium. Because the device essentially responds to the average applied magnetic field, the resolution of an unshielded stripe is practically limited to stripe height. This disadvantage is offset by the much higher output signal levels from the MR stripe when compared to conventional inductive heads.

FIG. 2 shows the shielded MR stripe geometry known in the art. The two shields 20 and 22 are disposed at a spacing (b) about the MR stripe 24, which is centered therebetween. Shields 20 and 22 operate to prevent stripe 24 from experiencing the field in the recording medium until the recorded transition is within one gap width (b) of stripe 24. The potential sensitivity function U(x,0) approximates the shape of the MR sensor output responsive to the passage of a very narrow transition in a thin medium. Thus, as gap spacing (b) is reduced, the potential sensitivity function exhibits increased sensing resolution, as is known in the art.

Thin film techniques are widely used for fabricating MR sensors because of the advantageous effects of very narrow gap separations (b) and stripe heights (h). FIG. 3 shows several common MR read-head designs. To achieve high resolution, the head in FIG. 3A has shields 20 and 22 on either side of current-carrying MR element 24. In FIGS. 3B and 3C, MR element 24 is placed in series with either one (FIG. 3B) or two (FIG. 3C) pole pieces (28 in FIG. 3B and 30, 32 in FIG. 3C). In FIG. 3B, pole piece 28 conducts the magnetic field from the recording medium 26 to MR element 24, which may be disposed in any convenient fashion. In FIG. 3C, high-permeability poles 30 and 32 guide the surface flux from recording medium 26 to magnetize MR element 24 in a part of the head yoke removed from medium 26. This approach removes the thin-film sensing element from wear at the head-medium interface. In FIG. 3D, a symmetrical barber-pole structure forces the read current $I_s$ to flow in opposite directions for adjacent halves of the recording track. This technique produces a linear read characteristic across the entire track. Also, high density multi-track configurations of MR elements can be configured thereby with neighboring sensors sharing one conductor.

It is known that shielding MR stripe 24 on both sides improves sensing resolution by preventing it from experiencing the field from the medium until the recorded transition is very close. Where the edge of the MR element is recessed from the face of the transducer head, the potential sensitivity broadens slightly and degrades with the amount of recession. Lateral displacement of the MR element toward one of the shields does not substantially diminish element sensitivity. Very thin shields tend to provide the relatively low-resolution characteristic of unshielded MR stripes.

The output of a MR stripe is a complicated function of the local fields in the stripe emanating from the recording media, the sensor biasing means, and the proximity of the shields or yokes that define the transducer head resolution. Maximum Linear sensor output is available when the MR stripe is biased with a magnetic field vector oriented at 45 degrees with respect to the linear biasing current flow. However, the precise local magnetic bias depends on the method of application and on the flux leakage paths away from the sensor. The presence of shields requires magnetic biasing inside the shields, as is known in the art. Many biasing schemes have been proposed. No single biasing scheme simultaneously offers all the advantages of simplicity, output amplitude, linearity and reproducability.

The largest and most complex class of biasing schemes involve applying a biasing field through an auxiliary microstructure proximate to the MR stripe. These schemes include shunt biasing (using a current-carrying conductor adjacent the MR stripe), soft-film biasing (using a thin, electrically-insulated soft magnetic film adjacent the MR stripe), and hard biasing (using a hard magnetized film region at each end of the MR stripe). The distribution of magnetization produced by hard biasing is more uniform across the MR sensor than that produced by either shunt or soft-film biasing.

With canted current or "barber-pole" biasing, the signal response is linearized by forcing the sense current to flow at an angle of 45 degrees with respect to the magnetization direction in the MR stripe. This is usually accomplished in the art by overlaying the sensor with slanted strips of a conductive material so that, over most of the sensor area, the sense current flows perpendicularity to the strips, in the desired 45 degrees direction. Although the "barber-pole" biasing scheme is simple, it disadvantageously leaves the MR stripe in an underbiased state and results in more of a quadratic than a linear sensing response.

practitioners have steadily improved the biasing art by suggesting better ways To create a permanent magnetic bias along the longitudinal direction of the MR stripe. For instance, in U.S. Pat. No. 3,840,898, Bajorek, et al teach an internally-biased MR sensor using soft-film biasing means. Later, in U.S. Pat. No. 4,024,489, Bajorek, et al disclose a soft-bias layer technique for MR sensors. In U.S. Pat. No. 4,639,806, Kira, et al disclose a method for providing a much larger coercive field through the use of hard magnetic material. In U.S. Pat. No. 4,663,885, Tsang teaches a combined magnetic biasing technique that uses both hard and soft biasing methods to control the angle between the bias field and the sensor current. More recently, in U.S. Pat. No. 5,018,037 and 5,079,035, Krounbi, et al Teach an improved method for joining two hard-film biasing magnets to each end of an active MR sensing stripe.

Formation and nonlinear movement of domain walls in MR sensors is a source of Barkhausen noise for the reasons known in the art. Many solutions have been proposed for the problems related to domain wall formation, including signal current feedback techniques, symmetrical barber-pole structures, ultra-smooth thin film deposition techniques and domain control grating patterns underlying the MR stripe. In U.S. Pat. No. 4,477,794, Nomura, et al discloses a MR stripe domain control technique using a grating pattern under a thin film MR sensor element. Their grating pattern forces magnetic domain boundaries to remain stationary over the range of biases experienced during operation, thereby eliminating Barkhausen noise arising from sudden nonlinear domain wall shifts.

Because of a long-felt need for simultaneous optimization of several MR sensor performance parameters, practitioners have suggested numerous minor improvements to the art. For instance, in U.S. Pat. No. 4,556,925, Suenaga, et al combines a barber-pole MR element with rounded end MR stripe geometry to provide improved magnetic domain conditions at the ends of the sensor stripe. In another example, Mowry (U. S. Pat. No. 4,843,505) reports his discovery that a 1.5 micron projection on the edge of a MR stripe improves tracking performance without the expected distortion penalty arising from additional domain formations. Mowry reports that the penalty-free tracking improvement arises because the 1.5 micron projection is too small to permit creation of new magnetic domains at the sensor edge.

There is a continuing clearly-felt need in the art for improved solutions to performance tradeoffs such as sensitivity versus bandwidth, sensitivity versus noise, sensitivity versus tracking precision, and such like. For instance, improved noise performance is possible in MR sensors upon payment of a bandwidth penalty. Greater separation between sensor and media improves noise by eliminating thermal asperity transients but extracts a sensitivity penalty. Improved MR stripe biasing is available in a nonshielded MR sensor but only in exchange for an unacceptable loss of bandwidth and sensitivity.

Some practitioners have proposed unusual schemes for exploiting some of these tradeoffs in special situations. For instance, in U.S. Pat. No. 4,757,410, Seko, et al disclose a novel multi-channel design for Digital Audio Tape (DAT) head applications. Seko, et al teach a method for fabricating several side-by-side MR sensors on a single substrate. By varying the MR sensor recession depth, Seko, et al can vary the bandwidth sensitivity of the particular sensor. Thus, the "servo" head element may be spaced further from the medium compared with the "data" head element to improve the low frequency response and, thereby, improve servo-tracking precision. However, Seko, et al neither teach nor suggest a method for improving the magnetic bias uniformity in the MR stripe for better servo-tracking precision.

There is a clearly-felt need in the art for a simple and reliable technique for fabricating multiple-channel MR sensing heads that produces accurate servo-tracking performance while also producing stable and linear high-density data sensing elements. The related unresolved problems and deficiencies are clearly felt in the art and are solved by this invention in the manner described below.

SUMMARY OF THE INVENTION

This invention solves some of the above problems by providing a multi-track head design and thin-film fabrication process that produces improved microtrack profile uniformity for servo elements while also simultaneously producing stable and linear data sensing elements for high density tape head applications. It is an object of this invention to fabrication stable, reliable MR data and servo sensing elements for high density tape head applications using thin film planar processing techniques. It is also an object of this invention to provide these improvements through a useful combination of hard and soft magnetic stabilization with substrate grating patterns under both the central active region and the passive end regions of the MR stripe.

This invention arises in part from the unexpectedly advantageous observation that separating the MR servo sensing element from the ferrite substrate by at least one micron improves the shape anisotropy of the MR stripe and also improves the effectiveness of the hard bias CoPtCr longitudinal stabilizing magnets in the passive end regions of the MR stripe. The inventors have also unexpectedly discovered that the outer magnetic shield may be removed from the MR servo sensing element to gain similar advantages without imposing unacceptable bandwidth penalties in servo applications.

It is an advantage of the servo MR sensor of this invention that elevating the servo MR sensor above the first shield in the substrate and removing the second shield completely results in a improved linearization of the microtrack field profile across the servo MR sensor. It is an advantage of this invention that the reduced bandwidth resulting from such shielding changes remains adequate for sensing the servo signals needed for servo-positioning.

It is also an object of this invention to minimize Barkhausen noise by mechanically limiting magnetic domain shifting in both the MR central active region and in the hard bias longitudinal stabilizing magnets at each passive end region of the MR stripe. It is a feature of this invention that both the data and servo elements may be fabricated in a common process on such grating patterns laid down on the same substrate. It is an advantage of the fabrication method of this invention that a grating pattern can be simultaneously produced beneath both unelevated data and elevated servo MR sensor elements. The grating pattern for the servo sensor element is elevated by replication of the substrate grating pattern in accordance with the method of this invention.

It is a distinctive feature of this invention that the servo MR sensor is elevated from the shielding substrate but is not necessarily recessed from the air bearing surface (ABS) at the magnetic medium.

It is yet another object of this invention to provide a superior etch stop layer above the elevated servo sensor for use in processing the removal of the second shield layer above the servo sensing region. A 100 nm silicon dioxide layer is deposited only over the servo structure and is a superior etch stop because of the deposition parameters allowing minimal pinhole formation and maximum coverage of the numerous underlying alumina pinholes and varying structural topography. The barrier layer of this invention allows yield improvements without significantly increasing the number or cost of process steps required for fabrication of the multitrack head of this invention.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 3 FIGS. 3A–3D shows several magnetoresistive read-head designs from the prior art;

FIGS. 11A, 11B, 11C, 11E, 11G, 11I, 11K, 11L, 11O, 11T and 11U twenty-three selected fabricating steps of the multichannel sensor fabricating method of this invention; as set forth in FIGS. 12A–12W FIGS. 12A–12W show the twenty-three selected fabrication steps;

DETAILED DESCRIPTION OF THE PREFERRED EMBODIMENTS

The Dual Sensor Geometry of This Invention

Figure 4:
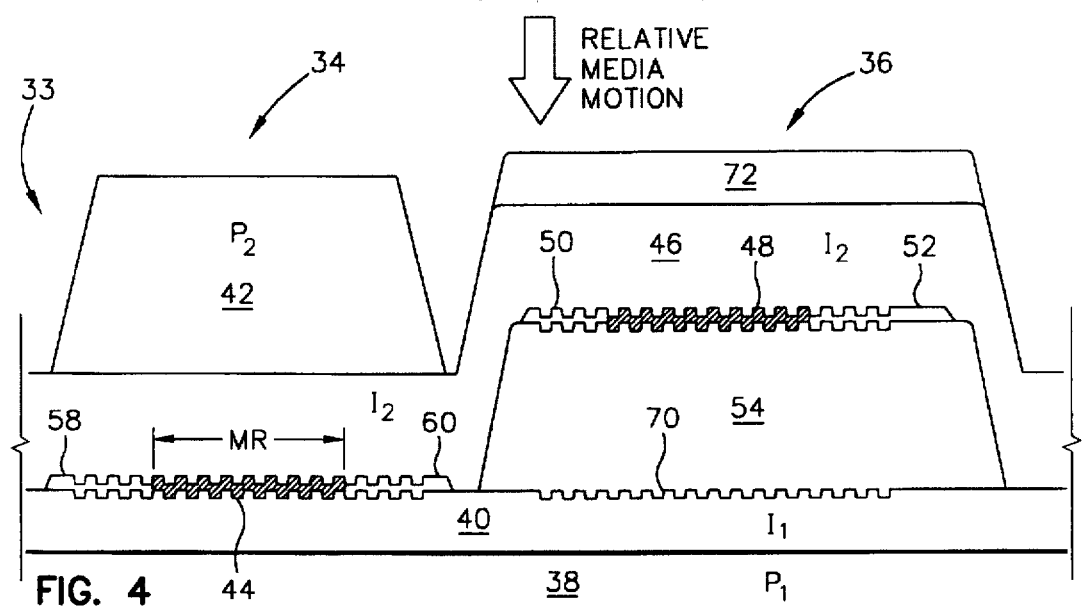
FIG. 4 shows a front cross-sectional view of the multichannel thin-film tape head sensor of this invention.

FIG. 4 shows a schematic representation of a side view of the dual MR sensor assembly 33 of this invention. The MR data sensor 34 is disposed immediately to the left of the MR servo sensor 36. Servo sensor 36 is offset by about 0.72 microns from data sensor 34 along the direction of recording medium motion. Thus, dual sensor assembly 33 can be used to read two side-by-side data and servo tracks on a magnetic recording medium (not shown) where the servo signal output is offset from the data signal output by the temporal equivalent of 0.72 microns. The 1.0 micron separation from the $p_1$ shield substrate 38 achieves a more uniform microtrack profile in servo sensor 36 to ensure high accuracy servoing of the tape head (not shown).

In comparison to servo sensor 36, data sensor 34 is a high-resolution broadband read element that is separated from $p_1$ shield substrate 38 by only 0.28 microns of alumina ($Al_2O_3$) insulating material in the $I_1$ layer 40. The $p_2$ shield layer 42 is similarly spaced from the MR stripe 44 by the 0.32 micron alumina $I_2$ insulating layer 46. Thus, data sensor 34 includes a double-shielded MR stripe 44 essentially centered in a shield gap (b) of 0.68 microns. This narrow gap between shields 38 and 42 gives good high frequency performance in support of high density recording on the data track (not shown).

Servo sensor 36 can be operated at a lower frequency because it need provide only a signal for mechanically positioning sensor assembly 33 in response to a previously recorded servo track (not shown). The outer (p2) shield is absent in servo sensor 36. By elevating the MR stripe 48 from substrate shield 38 and removing the $p_2$ shield (not shown), the effects of both the soft film biasing (SFB) element (FIG. 6) underlaying MR stripe 48 and the hard film stabilizing magnets 50 and 52 can be dramatically improved, as shown in FIG. 7.

Figure 7:
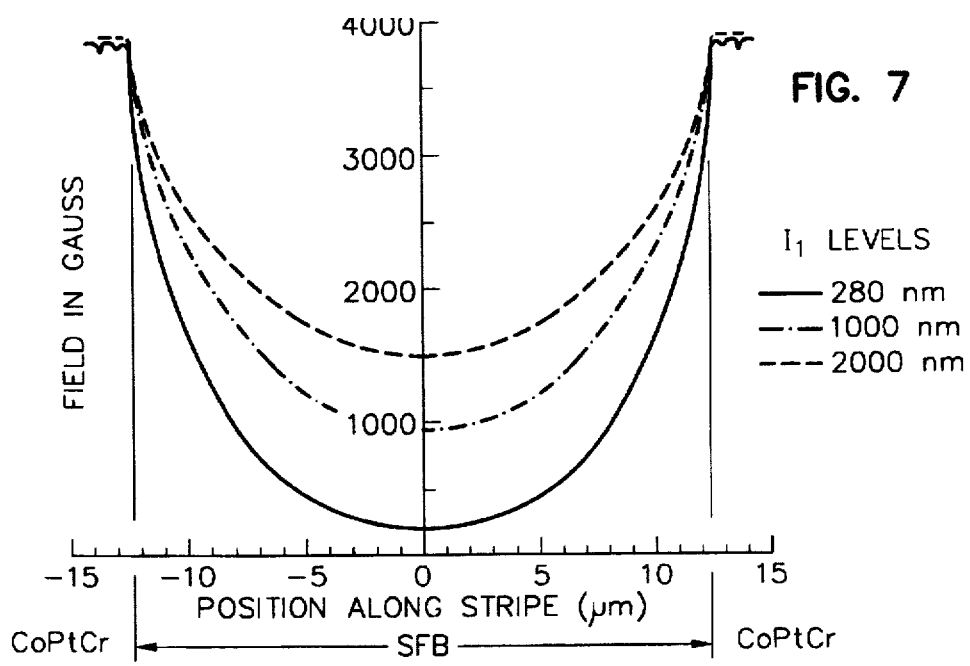
FIG. 7 shows the transverse field profile in the magnetoresistive stripe of this invention as a function of stripe separation from the substrate shield layer.

Referring to FIG. 7, three longitudinal magnetic field profiles are shown as a function of position along the longitudinal axis of MR stripe 48. Each of the three curves in FIG. 7 represents the magnetic field profile for a different thickness of $I_1$ layer 40 separating stripe 48 from $p_1$ shield substrate 38. At 0.28 microns separation, the longitudinal field magnitude is inadequate for modern servo-positioning applications because the longitudinal magnetic field biasing in MR stripe 48 varies by a 20:1 ratio from center to ends of MR stripe 48. By adding a 0.72 micron insulating layer 54 under stripe 48, the separation from $p_1$ substrate 38 is increased to one micron, which improves the longitudinal field profile by over 500% to a 4:1 ratio. A two micron separation improves the field profile ratio to less than 3:1 , which is a mere 30% additional improvement. An additional improvement in microtrack uniformity and noise levels results from adding the grating pattern under MR stripes 48 and 44 in FIG. 4. The top view of the grating pattern preferred for this invention is shown in FIG. 5.

Figure 5:
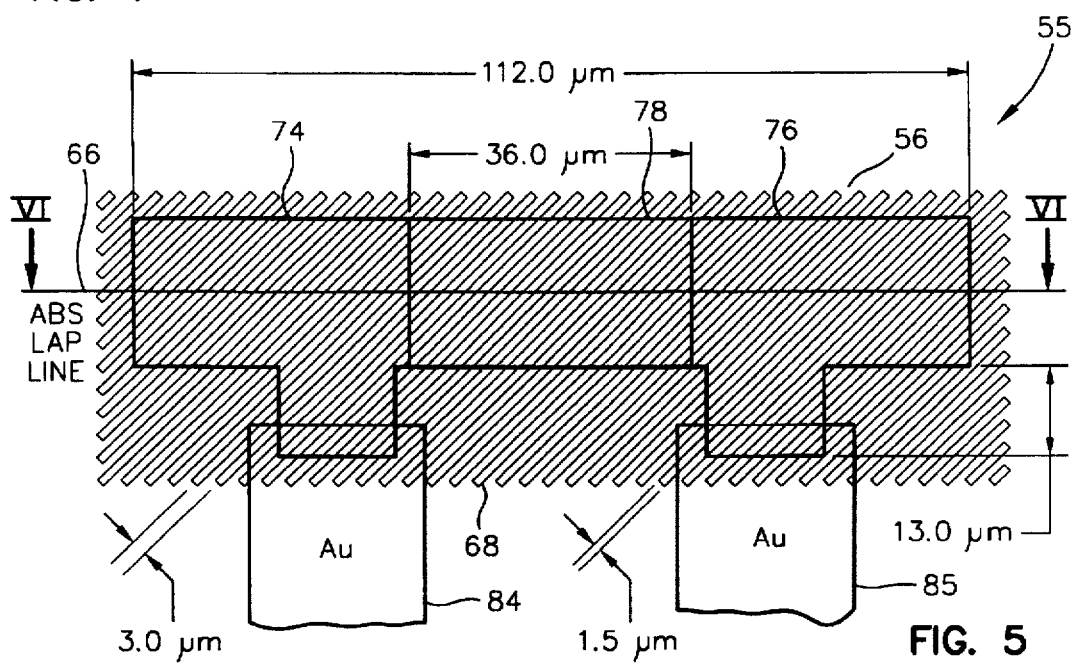
FIG. 5 shows a top view of the sensor from FIG. 4.

Referring to FIG. 5, a single thin film sensor is illustrated. Either data sensor 34 or servo sensor 36 can be understood from FIG. 5, the precise structure preferred for the hard-film stabilized soft-film biased MR sensor 55 of this invention. These details are further described in FIG. 6 for single MR sensor 55.

Figure 6:
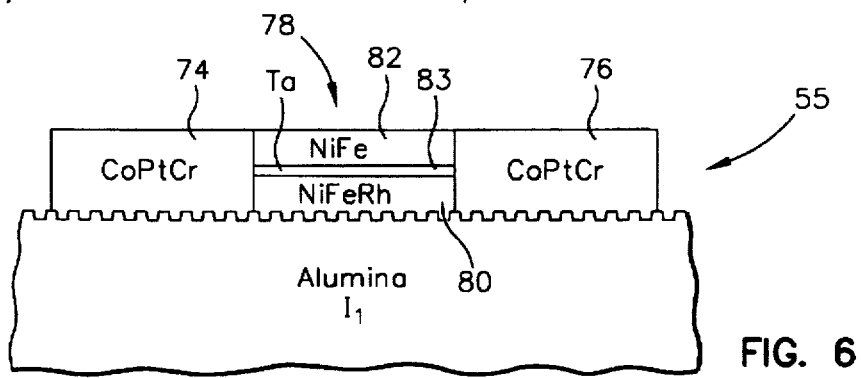
FIG. 6 shows the cross-sectional view of a single illustrative magnetoresistive sensor of this invention taken along plane V1—V1 of FIG. 5

The preferred grating pattern 56 consisting of a series of grooves, exemplified by groove 68, oriented at approximately 45 degrees with respect to the longitudinal axis of sensor 55. FIG. 6 shows a section through sensor 55. The hard film stabilizing magnets 74 and 76 are deposited in the passive end regions of sensor 55. Region 78 also contains a layer of soft film biasing (SFB) magnetic material 80 that is spaced from the magnetoresistive material layer 82 by a thin spacing layer 83. The active central region 78 is the only region containing magnetoresistive material 82. In the preferred embodiment of sensor 55, SFB layer 80 consists of NiFeRh and thin spacing layer 83 consists of Ta. The grating notches are not shown to scale in FIG. 6.

FIG. 5 shows the typical dimensions for preferred sensor 55. Central active region 78 is 36 microns long and each of the passive end regions 74 and 76 contains a hard film biasing magnet layer of CoPtCr that is also 36 microns long. Hard film stabilizing magnets 74 and 76 are equipped with tabs for contact with the gold lead films 82 and 84 shown. The gold tabs are recessed from the ABS to avoid corrosive interaction with other metal alloys at the ABS. These tabs are approximately 13 microns in length. Note that the grooves exemplified by groove 68 are disposed at a center-to-center separation of three microns and are separated by ridges of approximately 1.5 microns in width. Following completion of the assembly fabrication, magnets 74 and 76 are then initialized with an external magnetic field to achieve very high linearity and low Barkhausen noise levels. The depth of the etched pattern is adjusted to the thickness of SFB layer 80 in MR stripe 44, which is typically 30 to 60 nm. Electrical contact is made through the junctions between gold layers 84 and 85 and magnetic layers 74 and 76 and the junctions between magnetic layers 74 and 76 and MR stripe 78. The depth of the etched pattern is nominally 45 nm with a lower Limit of about 30 nm and an upper limit of about 80 rim. Beyond the SFB trilayer thickness of 246 mm (FIG. 6), the portions of the MR elements that switch against the grooves and ridges begin to infringe on the linear operating region of the sensor.

In FIG. 5, a lap Line 66 marks the eventual Air Bearing Surface (ABS) of the completed sensor assembly 55. Following completion of the thin film processing of this invention, the edge of completed assembly 33 (FIG. 4 ) is lapped or ground down to expose the edges of data sensor 34 and servo sensor 36 at ABS 66 where the assembly contacts the magnetic storage medium.

As already discussed, a grating pattern is provided under both MR strips 44 and 48 as well as all hard bias magnets 50, 52, 58 and 60 (FIG. 4). After complete head surface fabrication, hard bias magnets 50, 52, 58 and 60 are initialized with an external magnetic field of over 300 kA/m to achieve very high linearity and low Barkhausen noise in both respective MR sensors 34 and 36. The grating patterns act to trap domain walls mechanically between the grating edges and thereby reduce or eliminate Barkhausen noise arising from rapid and unpredictable domain wall shifts during changes in external magnetic field in the manner known in the art.

Figure 9A:
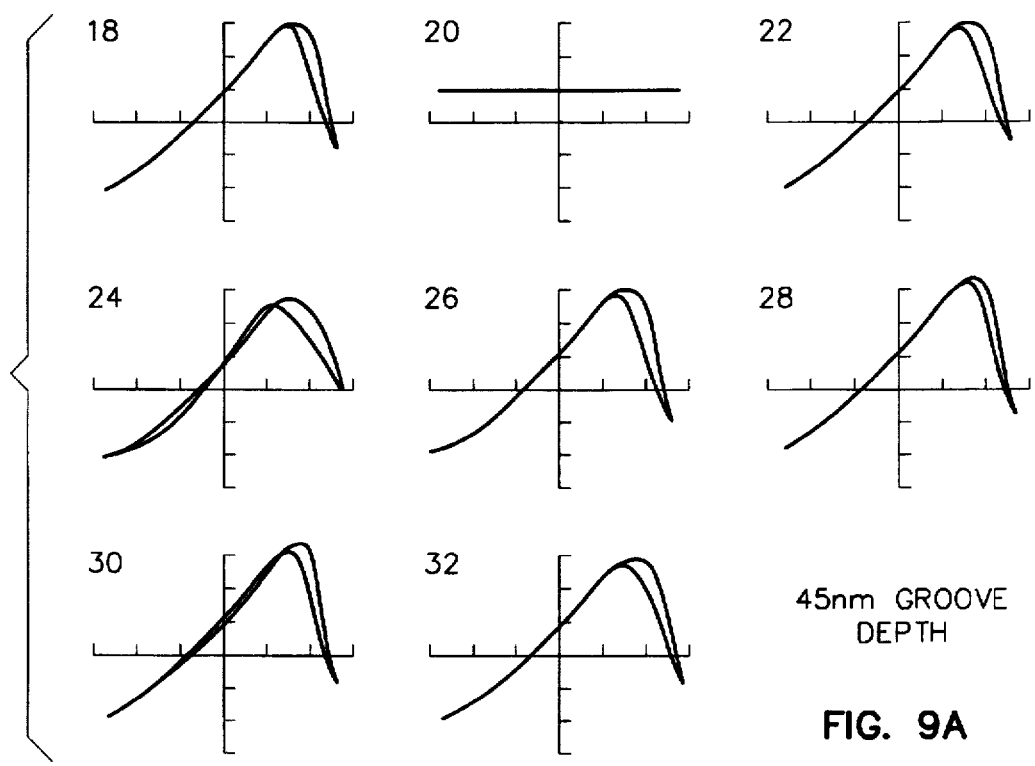
FIG. 9, comprising FIGS. 9A–9B provides illustrative examples of the magnetoresistive sensor output characteristics measured for two illustrative grating pattern groove depths.
Figure 9B:
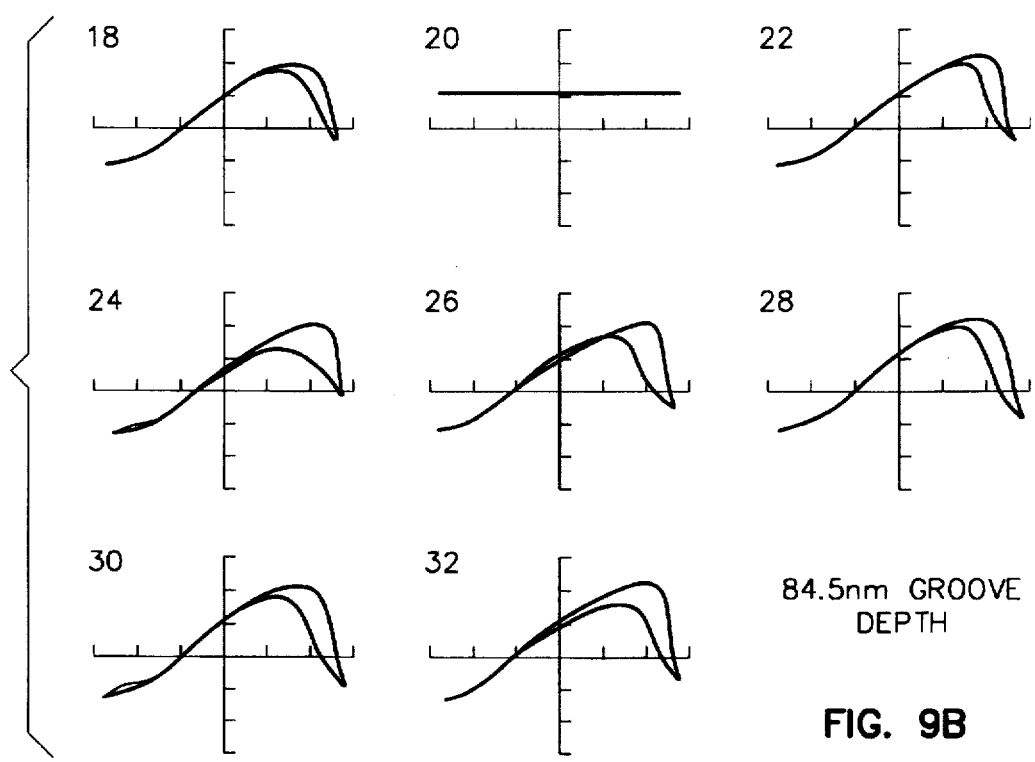

The effects of a 45 nm pattern groove depth compared with those of an 84.5 nm pattern groove depth in MR elements are shown in FIG. 9 for a SFB trilayer thickness of 246 min. FIG. 9A shows eight measured samples from a prototype substrate having 45 nm groove depths and FIG. 9B shows eight such sample measurements from a prototype having 84.5 nm groove depths. Note that several of the quasi-static loops in FIG. 9B are open very close to the sensor biasing point, which can cause unstable and nonlinear operation for large driving signals (e.g., sample numbers 24 and 32).

Figure 10A:
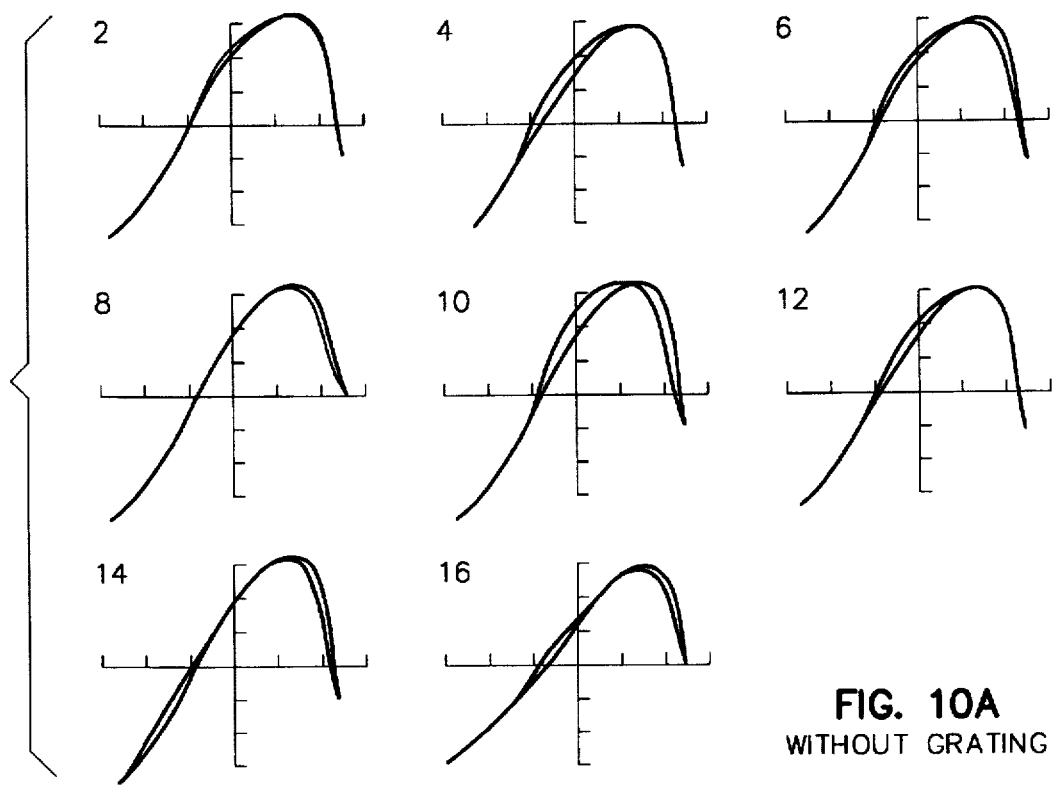
FIG. 10, comprising FIGS. 10A–10B, provides illustrative examples of the magnetoresistive sensor output characteristics measured with and without the grating pattern of this invention.
Figure 10B:
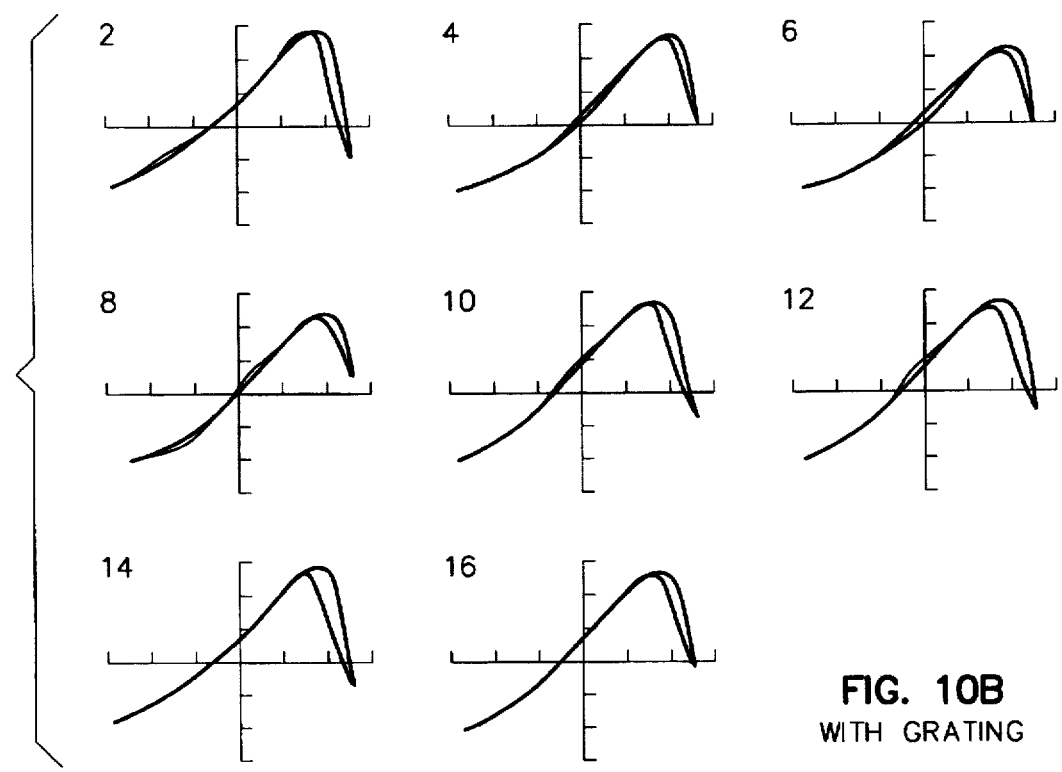

The effects of a 45 nm groove depth in comparison with those of no grating pattern in MR elements can be appreciated with reference to FIG. 10. FIG. 10A provides eight samples from a prototype having no grating pattern and FIG. 10B provides eight examples with 45 nm groove depth. Note that the MR element response is very nonlinear in FIG. 10A, leading to unacceptable distortion. The results in FIG. 10B clearly show the linearizing effect of adding a 45 nm grating pattern under the sensing element.

Figure 8A:
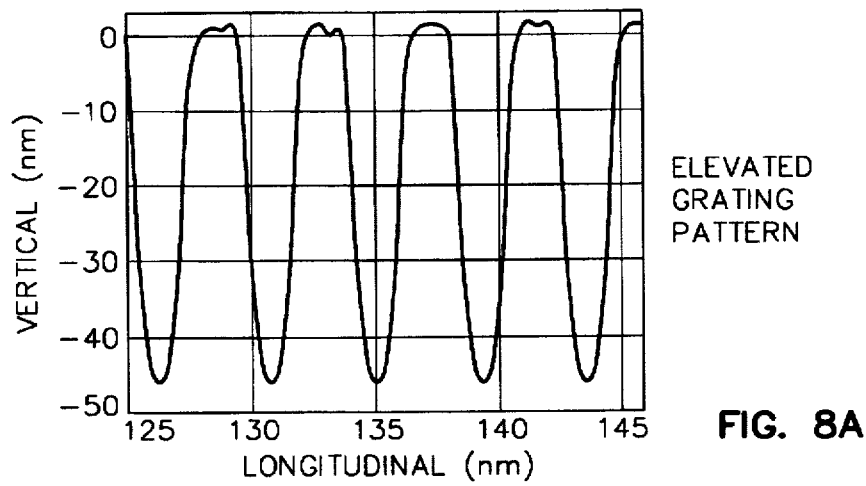
FIGS. 8A–8B shows an illustrative grating pattern used in the sensor of this invention.
Figure 8B:
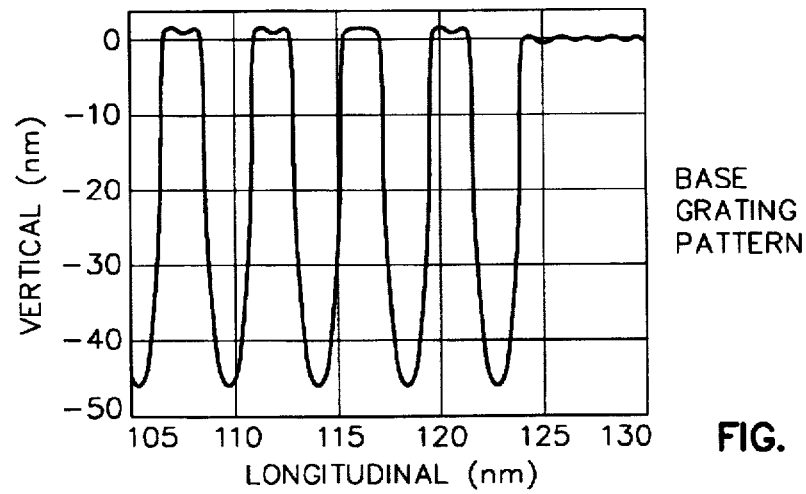

To produce the elevated grating pattern under servo sensor 36, a novel replication technique is employed. The pattern is replicated by depositing second insulating layer 54 on top of a first grating pattern 70 (FIG. 4). The unexpectedly advantageous results of this replication method are illustrated in FIG. 8, wherein FIG. 8A shows the measured vertical elevation of grating pattern 70 on $I_1$ layer 40 and FIG. 8B shows the measured vertical elevation of the elevated grating pattern under MR sensor 48 (FIG. 4 ). The groove depth in FIG. 8A is approximately 45 nm and the groove depth in FIG. 8B is approximately 50 nm, showing no significant deterioration resulting from the growth of second insulating layer 54. These results confirm that MR stripe 48 and MR stripe 44 both obtain equally effective grating patterns through the simplified fabrication method of this invention.

The $I_2$ insulating layer 41 is capped before final deposition of $p_2$ shield layer 42 with a 100 nm silicon dioxide layer 72 over servo sensor 36 only. Following deposition of $p_2$ layer 42, that portion of layer 42 over servo sensor 36 is removed by etching down to barrier layer 72. The 0.1 micron $SiO_2$ layer 72 acts as a superior etch stop during $p_2$ removal because of the deposition parameters allowing minimal pinhole formation and maximum coverage of the numerous $I_2$ alumina pinholes and structural topographies. Thus, barrier layer 72 allows production yield improvements without significant increase in the number of processing steps unique to the servo sensor 36.

The Thin Film Fabrication Procedure of This Invention

FIGS. 11A–11C, 11E, 11G, 11I, 11K, 11L, 11O, 11T and 11V, hereinafter referred to as FIG. 11 group, show twenty-three fabrication processing as explained in FIG. 12A–12W for the sensor fabrication methods of this invention. Steps in FIGS. 12A–12W are not all accompanied with a separate figure in the FIG. 11 group. The process begins with a NiZn substrate 86 shown in FIGS. 11A and 12A which constitutes the $p_1$ shield substrate.

In FIG. 11B and 12B the first $I_1$ layer 92 is formed by sputtering 0.28 microns of alumina on top of substrate 38. In FIGS. 11C and 12C, a grating or chevron pattern is milled into the top of layer 92 at two locations. The first pattern is milled in the data sensor region 94 and the second pattern is milled in the servo sensor region 96. The grooves in patterns 94 and 96 are masked and milled to a depth of 45 nm plus or minus 15 nm. The milled patterns are then cleaned and a resist layer (not shown) is added in the step of FIG. 12D.

FIGS. 11E and 12E shows the deposition of the 0.72 micron servo elevation layer 98, which may include either silicon dioxide or alumina. In the step of FIG. 12E, the masked region (not shown) is lifted off to leave layer 98 over servo sensor region 96 only as shown in FIG. 11E. The specific lift-off technique prevents action on adjacent structural areas that may cause performance instability. Sputtered elevation layer 98 replicates the grating pattern virtually unaltered, thereby allowing formation of all grating patterns in., the assembly through single in FIG. 12C step.

FIGS. 11G and 12G shows the sputtering of the soft film biasing (SFB) and magnetoresistive (MR) layers in the central active regions 100 and 102. The details of these layers 100 and 102 can be appreciated with reference to the above discussion in connection with FIG. 6. SFB layer 80 (FIG. 6) is deposited first to a thickness of 27 nm. Separation layer 84 (FIG. 6) is then deposited to a thickness of 20 nm followed by MR film layer 82 (FIG. 6) to a thickness of 35 nm. The SFB layers in the central active regions 100 and 102 are preconditioned by exposure to a magnetic field and heat in a manner known in the art for aligning magnetic domains of the SFB layers in the central active. The total layer thickness regions 100 and 102 is approximately 82 nm following completion of the step of FIG.12G.

In the step of FIG. 12H a sputter etching technique is used to remove material from a masked area (not shown) preparatory to the next step. FIGS. 11I and 12I show the depositing of the hard bias film layer in the passive end regions 104 and 106 of data sensor region 94 and the passive end regions 108 and 110 of servo sensor region 96. The hard film stabilizing magnetic layer 104,106,108 and 110 consists of 15 nm of Cr followed by 105 nm of CoPtCr for a total layer thickness of about 120 nm.

The step of FIG. 12J is a second sputter etching of a masked area (not shown) that defines the final MR and hard film magnet geometries. FIGS. 11K and 12K show the deposition of the gold conductors 112, 114, 116 and 118 at each end of both MR sensors. The gold conductor layer consists of 15 nm of Ti followed by 200 nm of gold topped off with another 5 nm of Ti for a total layer thickness of 220 nm. These initial gold lead structures are formed using a lift-off technique and evaporative deposition and are recessed from the ABS to avoid corrosive reactions upon exposure to air.

In FIGS. 11L and 12L the alumina $I_2$ insulating layer 120 is deposited to a depth of 0.32 microns plus or minus 10% over the entire assembly. The steps in FIGS. 12M and 12N represent the usual subsequent masking, etching, cleaning and resist steps preparatory to the deposition of a 100 nm silicon dioxide etch stop layer 122 in FIG. 11O. Note that etch stop layer 122 is deposited only over servo sensor region 96.

Etch stop layer 122 is patterned over the servo sensor region 96 alone by a lift off and sputter deposition technique. This step is very important; without layer 122, the pinholes through the alumina layer 120 may lead to later etching of the sensor element 102 during removal of $p_2$ layer 124 in the step of FIG. 12T. The silicon dioxide material in layer 122 is a superior etch stop because of deposition parameters permitting minimal pinhole formation and maximum coverage of the numerous alumina pinholes and structure topographies in layer 120. Thus, etch stop layer 122 allows yield improvements without significantly increasing the number or cost of the process steps needed for the servo sensor alone, which is an important feature of the fabrication method of this invention.

The step in FIG. 12D is another routine cleaning and resist step (not shown) followed by deposition of a second gold conductor layer (not shown) in step 11Q. These conductors are 2.5 microns in thickness and represent the primary electrical interconnections necessary between the sensing elements and the external package contacts. The step in FIG. 12R is yet another cleaning and resist step (not shown) preparatory to the subsequent shield deposition step in FIG. 12S.

In the step in FIG. 12S the $p_2$ shielding layer 124 is deposited over the entire assembly to a total thickness of 3.5 microns. $p_2$ layer 124 consists of 89 separate sputter depositions. The first of these is a 35 nm layer of NiFe. Subsequent depositions include 44 alternative layer pairs of Fe and NiFe deposited in nitrogen. During sputtering of $p_2$ layer 124, a magnetic field is applied to the assembly to prealign the $p_2$ magnetic domains in a manner known in the art.

Following deposition of $p_2$ layer 124, the step in FIG. 12T provides for the routine cleaning, masking, ion milling, etching, masking and chemical removing steps leading to removal of much of $p_2$ layer 124, leaving the $p_2$ data sensor shield 126 shown in FIG. 11T.

In FIGS. 11U and 12U an alumina overlayer 128 is deposited over the entire assembly to a thickness of 23.5 microns or more. The fabrication step in FIG. 12V include the finishing, lapping and deposition of a 200 nm Cr layer (not shown). Finally,the step in FIG. 12W provides electrical interconnections between sensors and external package controls (not shown). The assembly is cut back to the ABS line 66 shown in FIG. 5 during the lapping operation of step the step in FIG. 12V.

Figure 1:
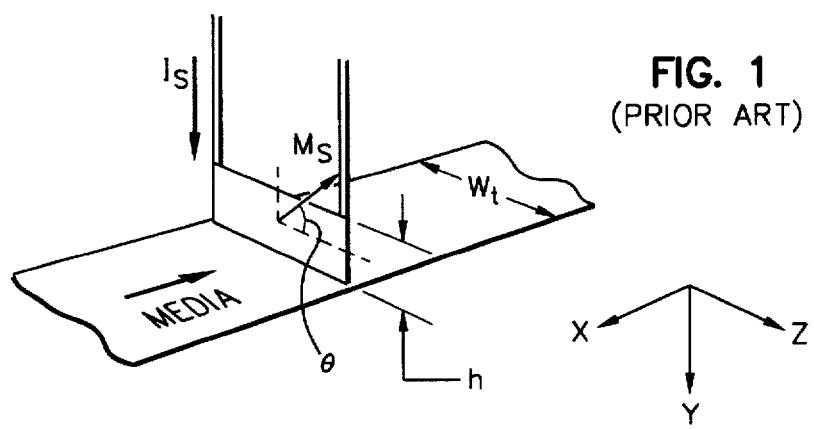
FIG. 1 shows a schematic representation of the magnetoresistive sensor stripe geometry from the prior art.
Figure 2:
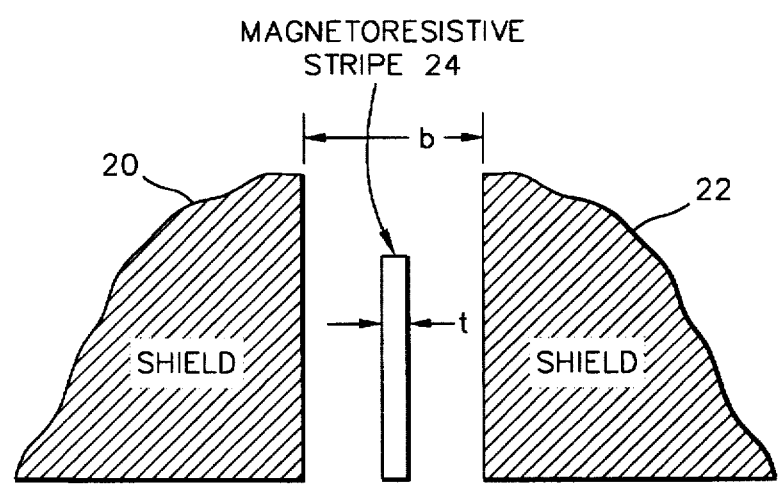
FIG. 2 shows a schematic representation of the shielded magnetoresistive sensor stripe geometry from the prior art.
Figure 13:
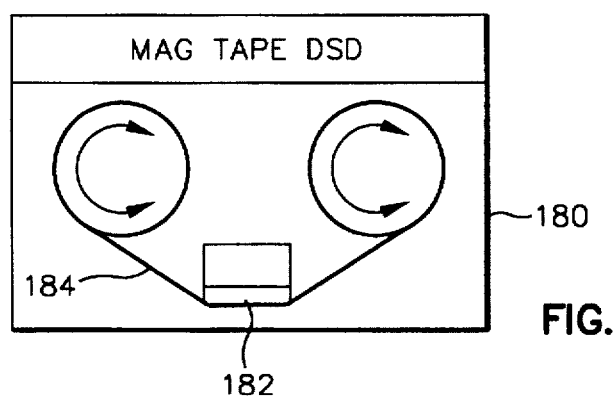
FIG. 13 shows a schematic view of a magnetic tape data storage system.
Figure 3A:
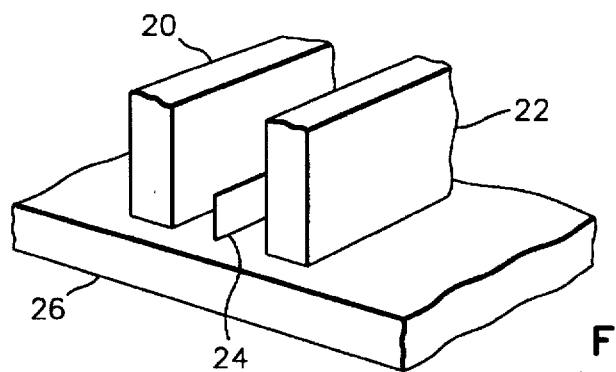
Figure 3B:
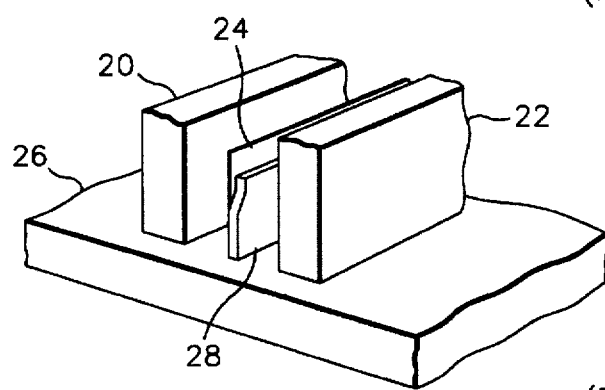
Figure 3C:
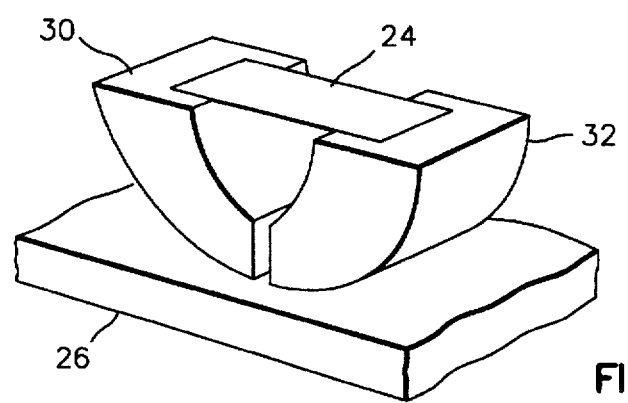
Figure 3D:
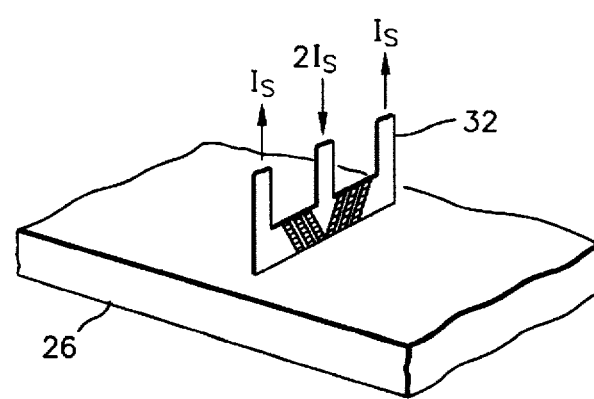

FIG. 13 shows a schematic representation of a magnetic tape data storage device 180 employing the magnetic head 182 of this invention to read data and servo signals recorded on the magnetic tape medium 184.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for fabricating on a substrate a thin film magnetic sensor assembly having at least one data sensor and at least one servo sensor, each said sensor having passive end regions separated by a central active region, said method comprising the steps of:
   (a) creating on the surface of said substrate a first grating pattern in a data sensor region of said substrate a second grating pattern in a servo sensor region of said substrate, and a grating pattern in each of the passive end regions of the substrate, each said grating pattern having a plurality of ridges and grooves;
   (b) depositing a first film of non-magnetic spacing material having substantially uniform thickness over said servo sensor region of said substrate, thereby replicating said second grating pattern at a first elevation above said substrate by providing said first film with an elevated second grating pattern which is elevated above the first grating pattern;
   (c) depositing a second film of magnetoresistive material over said central active region of said first grating pattern to form said at least one data sensor and over said central active region of said elevated second grating pattern to form said at least one servo sensor with said at least one servo sensor elevated above said at least one data sensor;
   (d) depositing a third film of hard magnetic material over each said passive end region of each of the said at least one data sensor in the data sensor region and said at least one servo sensor in the servo sensor region to form abutting junctions with said magnetoresistive material at each end of the respective said central active region of said respective sensor so that a longitudinal magnetic bias is thereby produced at each said passive end region of each sensor;
   (e) depositing a fourth film of non-magnetic spacing material over said substrate; and
   (f) depositing a fifth film of magnetic shielding material over said data sensor in the data sensor region but not over said at least one servo sensor in the servo sensor region.

2. The method of claim 1 wherein said second depositing step (c) comprises the additional step of:
   (cc) depositing a biasing means for producing a transverse magnetic bias in at least part of the respective said central active region of each of said at least one data sensor and said at least one servo sensor.

3. The method of claim 2 wherein said depositing step (cc) comprises the step of:
   (cc.1) depositing a film of soft magnetic material over and spaced from said second film of magnetoresistive material in at least part of the respective said central active region of said at least one data sensor or said at least one servo sensor.

4. The method of claim 1 wherein said depositing step (f) comprises the steps of:

(f.1) depositing a sixth film of silicon dioxide over at least said at least one servo sensor;

(f.2) depositing said fifth film of magnetic shielding material over said at least one data sensor and said at least one servo sensor; and (f.3) removing all of said fifth film of hard magnetic shielding material from said at least one servo sensor employing the sixth film as a protective layer for said at least one servo sensor.

5. The method of claim 1 wherein said first uniform film of non-magnetic spacing material comprises:

at least one material selected from the group of silicon dioxide and alumina.

6. The method of claim 1 wherein said fourth film of non-magnetic spacing material comprises:

at least one material selected from the group of silicon dioxide and alumina.

* * * * *

UNITED STATES PATENT AND TRADEMARK OFFICE
CERTIFICATE OF CORRECTION

PATENT NO. : 5,713,122
DATED : February 3, 1998
INVENTOR(S) : Aboaf et al

It is certified that error appears in the above-identified patent and that said Letters Patent is hereby corrected as shown below:

Column 9, Line 37, change "FIG. 12D" to --12P--

Signed and Sealed this

Eleventh Day of July, 2000

Attest:

Q. TODD DICKINSON

*Attesting Officer*        *Director of Patents and Trademarks*